UNITED STATES PATENT OFFICE.

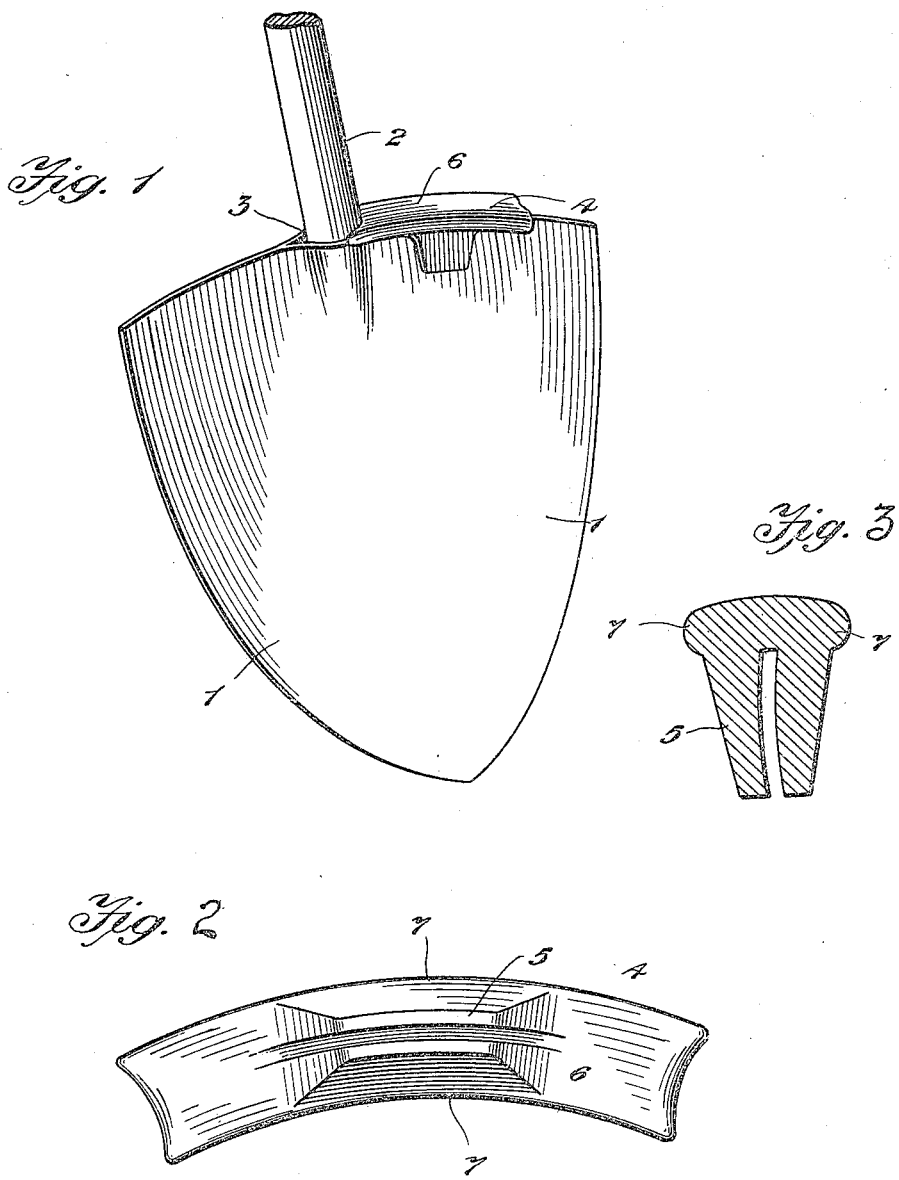

GEORGE J. WALSH, OF BROOKLYN, NEW YORK.

SHOVEL ATTACHMENT.

953,245.  Specification of Letters Patent.  Patented Mar. 29, 1910.

Application filed July 3, 1909. Serial No. 505,799.

*To all whom it may concern:*

Be it known that I, GEORGE J. WALSH, a citizen of the United States, residing at Brooklyn, in the county of Kings and State of New York, have invented certain new and useful Improvements in Shovel Attachments, of which the following is a specification.

This invention relates to improvements in shovel attachments.

One of the objects of the invention is the construction of a simple device to be easily attached to a shovel that will effectively protect the shovel against injury due to the constant application of foot pressure thereto.

Another object of the invention is the construction of a device attachable to shovels that will effectively protect the shovels against injury due to the application of foot pressure thereto and will also protect the shoe and foot of the operator.

With the above and other objects in view the invention embraces certain constructions, combinations and arrangements of parts, clearly described in the following specification and illustrated in the accompanying drawings in which, Figure 1 is a perspective view showing the application of the device to a shovel, Fig. 2 is a detail bottom plan view, and Fig. 3 is a detail sectional view of the device.

Referring to the accompanying drawings 1 denotes a shovel having a handle 2 connected thereto by means of a socket 3. The shovel may be of any construction and forms no part of my invention.

In practice the handle of the shovel is grasped and pressure applied so that the shovel will enter the ground to be excavated. When the shovel does not readily penetrate or enter the ground pressure is applied by means of the foot to the upper horizontal edge of the shovel. As some shovels are used in very hard ground or for the excavation of rock and similar materials it is necessary for the operator to frequently apply his foot to the upper edge of the shovel so as to add to the pressure which he is capable of exerting by means of his arms. This frequent practice of applying the foot to the shovel, often by means of sharp blows, soon causes the shovel to break down at the engaged point, thus resulting in its early disuse. Another result of the practice is that the shoe and often the foot of the operator is injured, all of which limit the capacity of excavation. By means of my improved device these difficulties are overcome without rendering the shovel less efficient or causing it to be less useful.

The device is formed out of a single piece of metal or material, and consists of a protecting attachment 4, having a bifurcated shovel engaging or saddle portion 5, and a transversely disposed edge engaging head 6. The head 6 extends on either side of the saddle portion 5 and is preferably provided with outwardly extending flanges 7, whereby the head is made considerably wider than the thickness of the shovel.

The protecting device is attached to the shovel by means of the saddle portion 5, which is adapted to be forced onto the shovel, so that the same will not be displaced when mounted thereon.

The device is preferably formed with a longitudinal curve greater or lesser than the curve of the shovel and the legs of the device are either curved toward each other or angularly inclined toward each other so that the same will bind on the shovel when forced thereon, the outer opposite portions of the legs being rounded or beveled.

When placed in position on the shovel the protecting head of the device serves as an abutment, of a non-cutting nature.

Owing to the greater surface which the protecting head presents to the engaging foot a greater pressure can be applied to the shovel and the shoe or foot of the operator will not be injured by the repeated application of pressure thereto.

As the head 6 extends over a considerable portion of the shovel edge the same is thus prevented from spreading or splitting.

Having described my invention I desire to secure by Letters Patent:

A device of the character described consisting of a shovel engaging portion and a head thereon, said engaging portion being adapted to straddle the upper edge of a shovel, the straddling portion being curved to conform approximately to the curve of the said edge of the shovel but varying sufficiently to bind with said edge when forced thereon.

In testimony whereof I affix my signature, in presence of two witnesses.

GEORGE J. WALSH.

Witnesses:
ANDREW DE VOTI,
GUS. COONS.